US005984846A

United States Patent [19]

Hirschberg et al.

[11] Patent Number: 5,984,846

[45] **Date of Patent: *Nov. 16, 1999**

[54] ROLLER

[75] Inventors: Sebastian Hirschberg, Winterthur; Armin Geiger, Bichwil, both of Switzerland

[73] Assignee: Buhler AG, Uzwil, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,257

[22] Filed: Nov. 26, 1997

Related U.S. Application Data

[63] Continuation of application No. 08/592,395, Jun. 21, 1996, abandoned.

[30] Foreign Application Priority Data

Jun. 6, 1994 [CH] Switzerland ............................ 1773/94

[51] Int. Cl.[6] ...................................................... B23P 15/00

[52] U.S. Cl. .................................. 492/6; 492/45; 492/57; 241/293

[58] Field of Search .................................. 492/6, 45, 57; 241/293

[56] References Cited

U.S. PATENT DOCUMENTS

| | | | |
|---|---|---|---|
| 3,852,860 | 12/1974 | Tewes . | |
| 4,974,782 | 12/1990 | Nelson | 241/293 |

FOREIGN PATENT DOCUMENTS

| | | |
|---|---|---|
| 2 153 871 | 5/1973 | France . |
| 2 203 701 | 5/1974 | France . |
| 2 349 762 | 11/1977 | France . |
| 42 05 167 A1 | 11/1992 | Germany . |

OTHER PUBLICATIONS

Copy of International Search Report—PCT/ISA/210.

*Primary Examiner*—I Cuda
*Attorney, Agent, or Firm*—Finnegan, Henderson, Farabow, Garrett & Dunner, L.L.P.

[57] ABSTRACT

A roll is described, particularly a roll for crushing or de-agglomerating different materials. It can be used in all situations where deformations of the roll ends, in association with a constant roll gap, constitute a problem, particularly at high roll loadings. The object of the invention is to further develop a roll of this type so that variable adjustments or a constant roll gap are possible at different operating stages. This object is achieved in that the roll consists of a core and a roll shell, wherein elastic elements are disposed between the core and the roll shell.

11 Claims, 1 Drawing Sheet

ROLLER

This is a continuation of application Ser. No. 08/592,395, filed Jun. 21, 1996, now abandoned.

FIELD OF THE INVENTION

This invention relates to a roll, particularly a roll for crushing or de-agglomerating different materials, such as granular bulk material, pigments and the like, for example, and also for treating sheet-like products, according to the precharacterising clause of claim 1.

It can be used in all situations where deformations of the roll ends, in association with a constant roll gap, constitute a problem in an operating situation.

Depending on their function, rolls disposed in roll mills, calenders and the like are either arranged parallel to each other with a defined spacing (roll gap or crushing gap) or they are pressed against each other practically without a gap. In this respect they undergo both wear and a certain deflection in operation, which results in departures from defined operating prerequisites. If a roll which is mounted at its ends is pressed against a second, similarly mounted roll, the rolls deflect. The deflection is greater in the middle than at the mounted ends.

A deflection such as this gives rise, in printing machinery for example, to an unequal contact pressure on the line of contact, which has an adverse effect on the print result. Solutions have been sought in order to compensate for a deflection of this type, particularly in the construction of printing machinery, where long, slender rolls are employed. Apart from comparatively simple solutions, such as the provision of elastic shell layers (rubber), the controlled-deflection roll is primarily employed, where roll deflections are compensated for in a controlled manner by means of costly constructional and control technology arrangements. This is primarily accomplished by hydraulic systems, wherein the roll is a rotating hollow roll with a stationary crosshead (see EP-A-451470 or EP-A-482318).

According to EP-A-451470, supporting elements arranged in rows against the internal periphery of the hollow roll are pressurised by means of a fluid in order thus to maintain a specific bending line.

In the known NIPCO rolls a hydrostatic bearing arrangement enables deflection to be compensated for. The production of a hydrostatic plain bearing such as this is very costly, however.

In contrast, the use of electromagnets instead of hydraulic systems is proposed in EP-A-21297. A multiplicity of electromagnets is disposed in the roll shell, with each of which a rotor and a sensor is associated, wherein the energization of the individual electromagnets can be controlled via the associated sensors.

As another possibility, EP-A-227302 proposes the construction of calender rolls as hollow rolls, in the interiors of which an axial support is again mounted. This axial support is mounted both at its ends and supported against the internal periphery of the hollow roll. In addition, the hollow shaft is also mounted at its external periphery at its ends.

The use of cambered rolls is also generally known, although by this means compensation for deflection is only possible for an adjusting force (specific pressure) which has to be determined beforehand by calculation. During changes which are necessary during operation, cambering such as this becomes inappropriate. However, for previously calculated operating situations it enables a uniform work of comminution to be achieved over the entire roll width for crushing rolls (smooth rolls).

Moreover, wear of the roll shell can be compensated for within limits by cambering or camber grinding. The underlying object of the present invention is now to further develop a roll of this type, particularly a crushing roll (smooth roll), so that on overcoming the disadvantages of the known prior art a non-controlled, passive compensation for deflection is provided in order to achieve a constant crushing gap. The aim is to achieve a high level of operational reliability at a cost which is technically and economically justifiable.

This object is achieved by means of the characterizing features of claim 1.

SUMMARY OF THE INVENTION

According to the invention, the roll contains a core with two-point mounting at its ends. Elastic elements are disposed between the core and a wear-resistant shell. The shell is supported by these elastic elements. The elastic elements may either consist of individual spring elements known in the art (e.g. elastomeric spring elements, metal springs and the like) or may be constructed in the form of a continuous or discontinuous elastic intermediate layer. An intermediate layer such as this is softer than the material used for the core and shell.

The spring travel of the elastic elements must be greater than the deflection of the roll core.

When individual spring elements are used, the size of the gap between the core and the shell likewise depends on the extent of the deflection, wherein the gap size must be greater than the latter. The fixed mounting of spring elements such as this must also be included in the determination of the gap size, if necessary.

It is possible to use spring elements of different stiffness, which enables deflection to be almost eliminated.

The solution according to the invention also enables longer rolls exhibiting low deflection to be produced, or enables cylinder mills having longer operative rolls to be manufactured more economically as regards compensation for deformation/deflection. Moreover, if the roll shell becomes damaged it can easily be replaced.

The gap can also be used for cooling in very different forms and in the form known in the art. For example, if a cooling coil is employed, with introduction of the coolant on one end face (with the "smaller" radius) and discharge of the coolant on the other end face, even thermal expansions which give rise to a tapered deformation of the roll are n to deleterious for the purpose of achieving a constant crushing gap, provided that the departure from the cylinder is significantly less than the deflection of the roll shell. The roll shell merely has to be linear.

The lower heat capacity of the roll shell proves to be favourable as regards control technology.

Using the roll according to the invention, it is possible to achieve a constant crushing gap at different operating stages, e.g. during start-up.

Cambering, which was hitherto customary for crushing rolls (smooth rolls), can be dispensed with.

A roll construction such as this makes variable adjustments possible when the loading is not constant and also at constant, higher loading.

In fact it is also known that elastic intermediate or outer layers can be used for the rolls of printing machinery, but these can only be used for considerably lower forces and pressures. It is not possible simply to transfer solutions of this type to the smooth rolls of the grinding compartments of a cylinder mill, or to a pigment roll mill, for example.

The invention is described in more detail below by way of an example of an embodiment and with reference to a drawing. The drawing illustrates the principle of a roll according to the invention.

DESCRIPTION OF THE PREFERRED EMBODIMENTS

Figure 1:
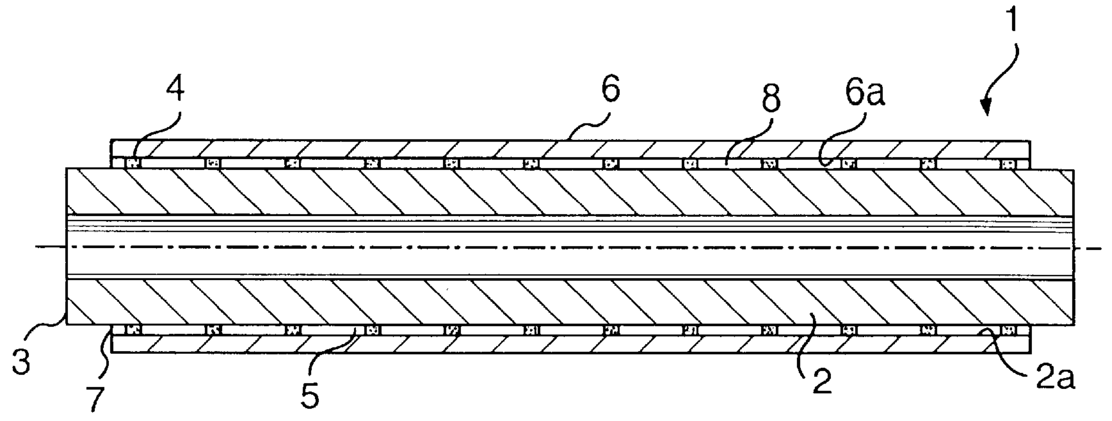
FIG. 1 is a schematic longitudinal cross-section of a first embodiment of the present invention having circumferential spring elements.

As seen in FIG. 1, a smooth roll 1, of length one meter, for a cylinder mill (grinding compartment) consists of a core 2 in the form of a thick-walled tube made of normal cast steel. The wall thickness is sufficient for the machining of the bearing stubs 3. The outer surface 2*a* of core 2 is merely turned. Commercially available spring elements 4 made of elastomer and of identical spring stiffness are disposed on the surface at intervals of about 100 mm, and are seated in guides 5 in accordance with their material properties. The outside diameter of the spring elements 4 is selected so that a gap 8 of about 10 mm is produced between the core 2 and a roll shell 6 made of chilled cast iron. This roll shell 6 is cylindrically ground on its outside diameter and is again merely turned on inside surface 6*a* of roll shell 6.

Because at a limiting loading of 50 N/mm roll length the eccentricity of the roll 1 is less than 1 mm, the gap 8 can also be reduced to just this size. The gap 8 is sealed at the sides, i.e. at the end faces of the roll, with customary sealing elements 7.

Figure 2:
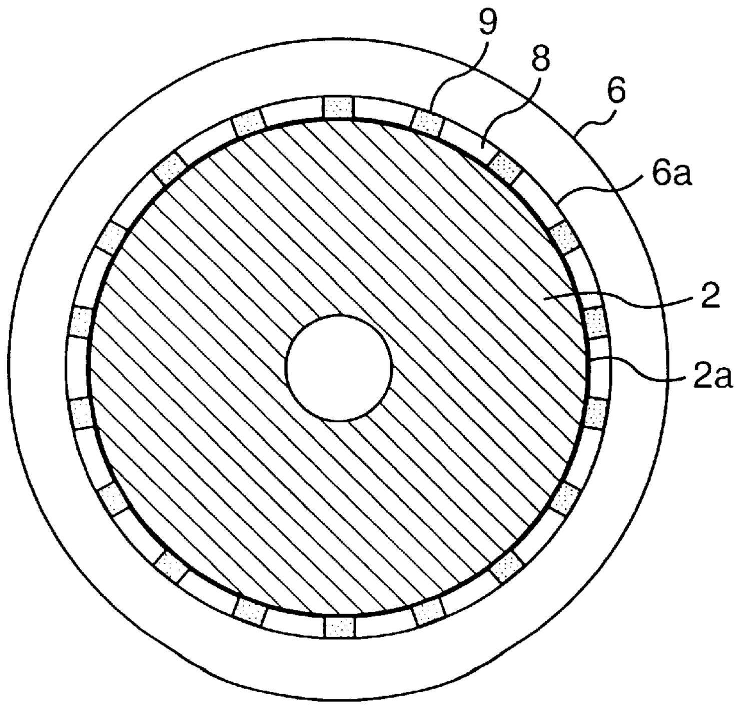
FIG. 2 is a schematic axial cross-section of a second embodiment of the present invention having longitudinal spring elements.

In a modified form of the invention as depicted in FIG. 2, the spring elements 4 may also be arranged in the manner of ribs, preferably in the form of discontinuous, prestressed longitudinal ribs which consist of polyurethane, for example, and which are adhesively bonded to or cast on the core 2. Sealing elements 7 are again disposed at the ends of the roll 1. In addition to the transmission of torque and its ease of manufacture, the arrangement of discontinuous longitudinal ribs also facilitates the optimum circulation of coolant, if necessary.

The roll 1 according to the invention, which is not restricted to the embodiment illustrated, enables a high level of functionality to be achieved at comparatively low manufacturing and operating costs, and in particular enables a crushing gap which is constant over many hours of operation to be achieved in association with the possibility of cooling. Its functional advantages during the uniform comminution or size reduction of material to be crushed are manifested in a longer service life and/or greater variability of the operating parameters. Moreover, it is thus possible, in pigment roll mills for example, to employ only one type of roll for different coloured pigments.

We claim:

1. A crushing roll with elastic elements to compensate for roll deflection and roll end deformation, wherein the roll comprises a cylindrical core having a circumference with a uniform outer diameter, a tubular roll shell surrounding and spaced from said core by a gap, the tubular roll shell comprising a single metal layer, and elastic elements disposed in said gap between the core and the roll shell, the elastic elements comprising a plurality of prestressed elongated ribs extending longitudinally with respect to the roll and being discontinuous around the core circumference.

2. The crushing roll as in claim 1 wherein each of the ribs has an identical spring stiffness.

3. The crushing roll as in claim 1 wherein the ribs are polyurethane ribs.

4. The crushing roll as in claim 1 wherein the ribs are angularly spaced around the core circumference.

5. The crushing roll as in claim 1 wherein the ribs are configured to allow coolant flow between said ribs.

6. The crushing roll as in claim 1 wherein the ribs are attached to the core by an adhesive.

7. The crushing roll as in claim 1 wherein the ribs are attached to the core by casting.

8. The crushing roll as in claim 1 wherein the circumference of the core comprises a turned outer surface.

9. The crushing roll as in claim 1 wherein the roll shell is cylindrical.

10. The crushing roll as in claim 1 wherein each of the plurality of elongated ribs has the same spring stiffness.

11. The crushing roll as in claim 1 wherein the cylindrical core has guides in the circumference, and wherein the ribs are positioned in the guides.

* * * * *